United States Patent [19]

Walter

[11] Patent Number: 4,527,454

[45] Date of Patent: Jul. 9, 1985

[54] ROTARY SHEET-METAL TRIMMING SHEAR

[75] Inventor: Horst Walter, Herdecke, Fed. Rep. of Germany

[73] Assignee: Hoesch Werke Ag, Dortmund, Fed. Rep. of Germany

[21] Appl. No.: 526,113

[22] Filed: Aug. 24, 1983

[30] Foreign Application Priority Data

Aug. 24, 1982 [DE] Fed. Rep. of Germany ....... 3231354

[51] Int. Cl.$^3$ .......................... B23D 19/06; B26D 1/24
[52] U.S. Cl. .......................................... 83/499; 83/479
[58] Field of Search .......................... 83/499, 479, 859

[56] References Cited

U.S. PATENT DOCUMENTS

| 2,872,980 | 2/1959 | Perrine | 83/498 X |
| 3,080,783 | 3/1963 | Knepshield | 83/479 |
| 3,260,146 | 7/1966 | Child | 83/479 |
| 3,685,379 | 8/1972 | Frye et al. | 83/499 X |

FOREIGN PATENT DOCUMENTS 2138476  3/1976  Fed. Rep. of Germany .

Primary Examiner—Donald R. Schran
Attorney, Agent, or Firm—Karl F. Ross; Herbert Dubno

[57] ABSTRACT

A rotary shear for trimming sheet metal has a main support beam extending perpendicular to a normal workpiece transport direction and symmetrical about a central upright plane extending in the transport direction, a pair of symmetrically identical housings carried on the beam and each displaceable therealong transverse to the direction, and respective pairs of upper and lower rotary trimming blades carried on the housings. The upper and lower blades are rotatable about respective common axes substantially perpendicular to the transport direction. The beam is of trapezoidal hollow section and has a generally planar upper surface formed by a family of parallel and horizontal lines and inclined downward against the transport direction. The housings are each provided with a slide having a planar lower surface lying generally flatly on the beam surface, and the housings and beam are provided with guides engageable parallel to the surfaces with each other. These guides extend horizontally perpendicular to the transport direction.

19 Claims, 7 Drawing Figures

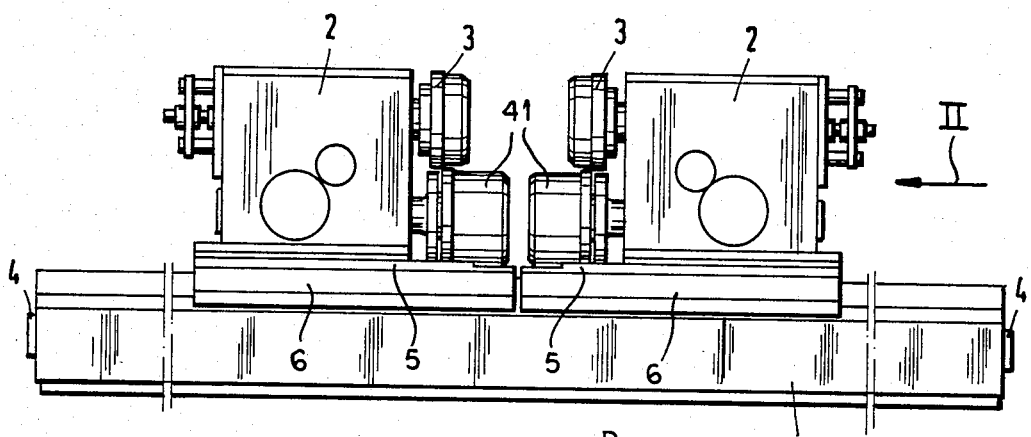
Fig. 1
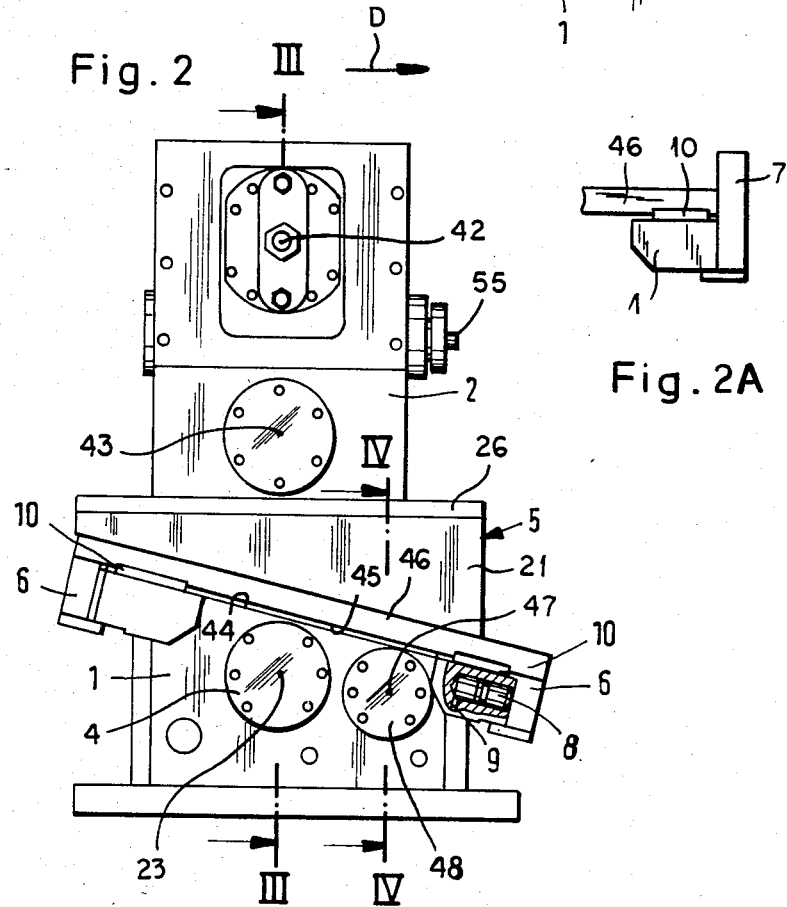
Fig. 2
Fig. 2A

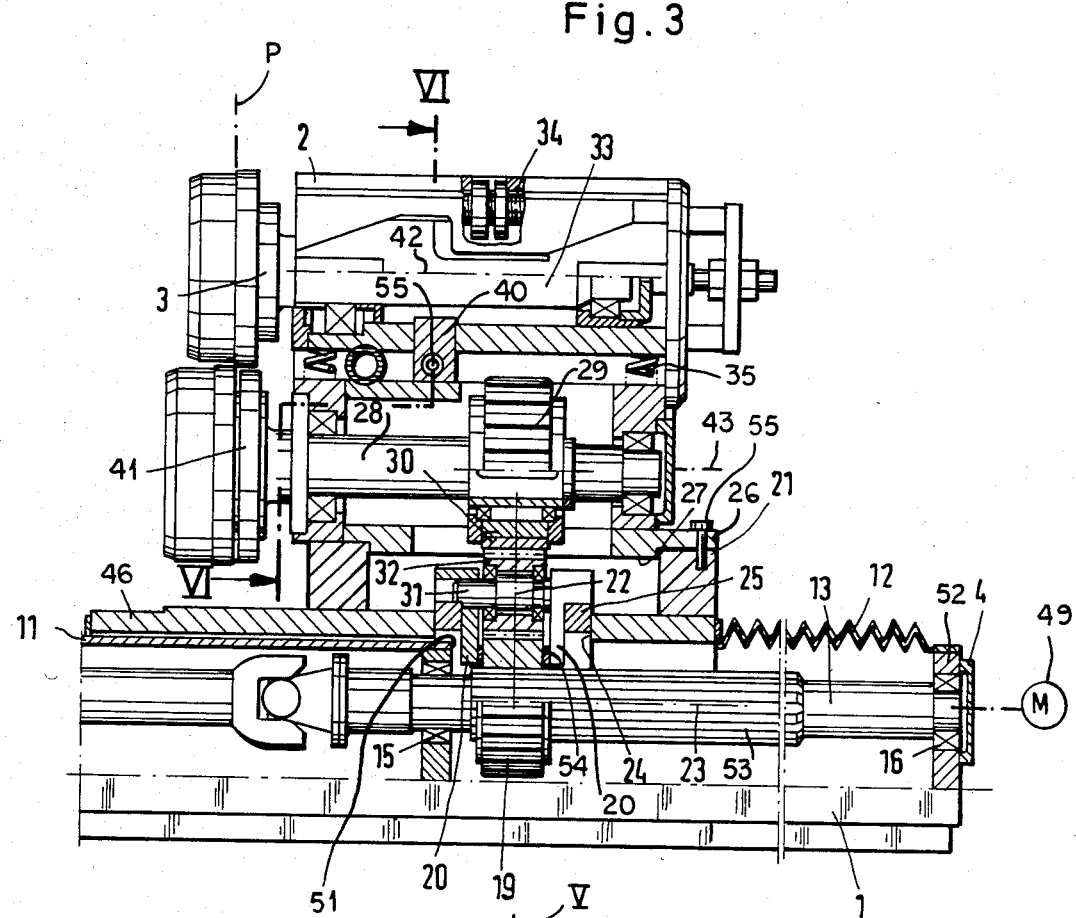
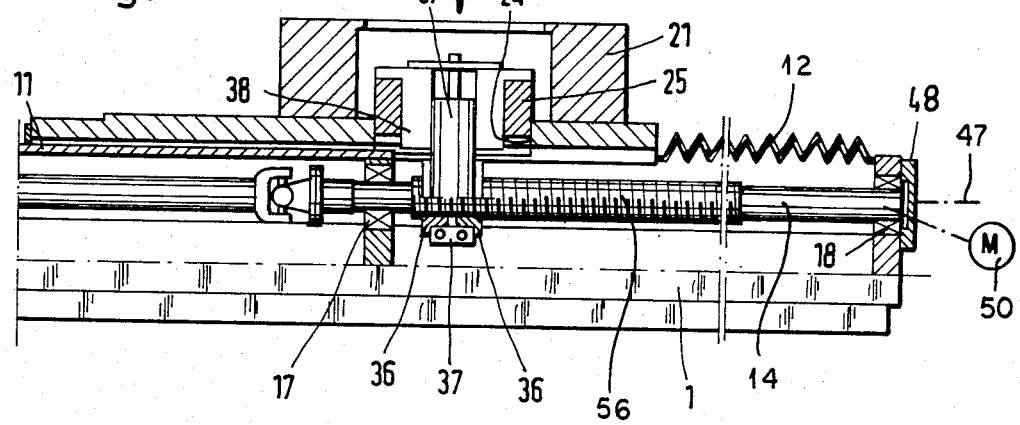

ROTARY SHEET-METAL TRIMMING SHEAR

FIELD OF THE INVENTION

The present invention relates to a metal shear. More particularly this invention concerns a rotary shear of the type used to trim strip sheet-metal stock.

BACKGROUND OF THE INVENTION

A standard sheet-metal trimming shear of the rotary type is described in German patent document No. 2,138,476 filed July 31, 1971 by W. Reinhardt. It has two pairs of circular cutting blades that are superposed to define a cutting plane parallel to the direction of displacement of the sheet-metal workpiece through the shear and that each constitute a cutting unit. The units are each responsible for a longitudinal edge of the workpiece and are spaced apart across the workpiece transverse to the workpiece travel direction. Transverse spindles can displace the cutting units transverse to the transport direction so the workpiece can be trimmed to the desired size.

These machines are very complicated and quite bulky, particularly those intended for use with thin stock. The initial cost of such an apparatus is very large, and servicing it can be extremely costly. The large size of the devices is also a hindrance in many production lines where the room available, particularly the transverse spacing, between lines is minimal.

OBJECTS OF THE INVENTION

It is therefore an object of the present invention to provide an improved rotary sheet-metal trimming apparatus.

Another object is the provision of such a rotary sheet-metal trimming apparatus which overcomes the above-given disadvantages, that is which is relatively inexpensive to manufacture and service, and which is quite compact.

A further object is to provide a trimming apparatus which can work on very thin stock.

SUMMARY OF THE INVENTION

A rotary shear for trimming sheet metal according to the invention has a main support beam extending perpendicular to a normal workpiece transport direction and symmetrical about a central upright plane extending in the transport direction, a pair of symmetrically identical housings carried on the beam and each displaceable therealong transverse to the direction, and respective pairs of upper and lower rotary trimming blades carried on the housings. The upper and lower blades are rotatable about respective common axes substantially perpendicular to the transport direction.

This symmetrical construction approximately halves the number of different parts that constitute the machine and that therefore need be stocked to effectively service the apparatus of this invention, while also making the apparatus that much easier to manufacture. In addition the servicing is quite simple, since both sides are identical.

According to another feature of this invention the beam is of trapezoidal hollow section and has a generally planar upper surface formed by a family of parallel and horizontal lines and inclined downward against the transport direction, that is this plane inclines upward in the travel direction toward the workpiece. The housings are each provided with a slide having a planar lower surface lying generally flatly on the beam surface, and the housings and beam are provided with guides engageable parallel to the surfaces with each other. These guides extend horizontally perpendicular to the transport direction and can be constituted as ridges projecting down from the slides and flanking the respective beam surfaces in the transport direction. Thus the slides are generally downwardly U-shaped. It is also possible to provide an upstanding guide on the lower edge of the beam surface, the other guide in this case being the edge of the slide that abuts this upstanding guide.

To ensure proper seating and positioning of the housings, they each have an actuator effective generally in the transport direction parallel to the surfaces to urge the guides together. This actuator can be a simple fluid-powered cylinder-and-piston unit housed either in the housing or in the beam, preferably in the latter for ease of connection.

The upper beam and lower slide surfaces according to this invention the surfaces are inclined so much to the horizontal that the guides are naturally urged together in the transport direction. Thus, the surfaces and materials of the slide and beam are such that the horizontal component of force effective by gravity between them is greater than the friction between them. Gravity therefore ensures proper positioning of the housings on the beam. Low-friction slide elements between the surfaces reduce the sliding friction therebetween.

The housing according to this invention is hollow and is substantially wholly closed. Thus it can be partially oil-filled for simple and sure lubrication of all critical parts.

The shear according to this invention also has drive means extending through the beam for rotating the blades about the respective axes and positioning means extending through the beam for displacing the housing transversely of the direction on the beam. The drive and positioning means include respective drive and positioning shafts extending horizontally transverse to the direction through the beam and respective pluralities of bearings supporting these shafts.

The positioning shaft has a pair of oppositely threaded end regions and the housings are provided with internally threaded nuts engaging the respective end regions. These nuts are displaceable limitedly in the transport direction on the housings, but not transversely thereto.

The drive shaft according to this invention is provided under each housing with a respective drive gear displaceable limitedly along the drive shaft but rotationally coupled thereto. Each housing is provided with support brackets carrying the respective drive gear and fixed in the housing against movement horizontally transverse of the transport direction, and also parallel thereto. In addition each lower blade is provided with a blade gear operatively engaged with the respective drive gear. The drive gear is of round shape.

A one-way clutch is connected between each lower blade and the respective drive gear. This clutch prevents the blades from braking the workpiece, and allow the machine to be operated with the workpiece driving the blades. In addition respective intermediate gears mesh with the respective blade and drive gears.

The blades are carried on blade shafts that are nonparallel to the respective drive and positioning shafts. Means is also provided for vertically displacing the upper blades relative to the lower blades, and for displacing the upper blade horizontally transverse to the transport direction relative to the respective lower blade.

The housings according to this invention each have a downwardly directed formation centered on an upright axis and each housing includes a slide sitting on the beam and having an upwardly directed formation complementary to and interfitting with the downwardly directed formation. The shear comprising means, such as bolts, for securing the housing in either of two 180° offset positions relative to the upright axis on the slide. This structure allows a cutter unit to be rapidly adapted for use either on the right- or left-hand side of the apparatus.

DESCRIPTION OF THE DRAWING

The above and other features and advantages will become more readily apparent from the following, reference being made to the accompanying drawing in which:

FIG. 1 is an end view of the apparatus according to this invention;

FIG. 2 is an large-scale side view taken in the direction of arrow II of FIG. 1;

FIG. 2A is a view of a detail of a variation on the arrangement of this invention;

FIGS. 3 and 4 are sections taken along respective lines III—III and IV—IV of FIG. 2;

SPECIFIC DESCRIPTION

Figure 5:
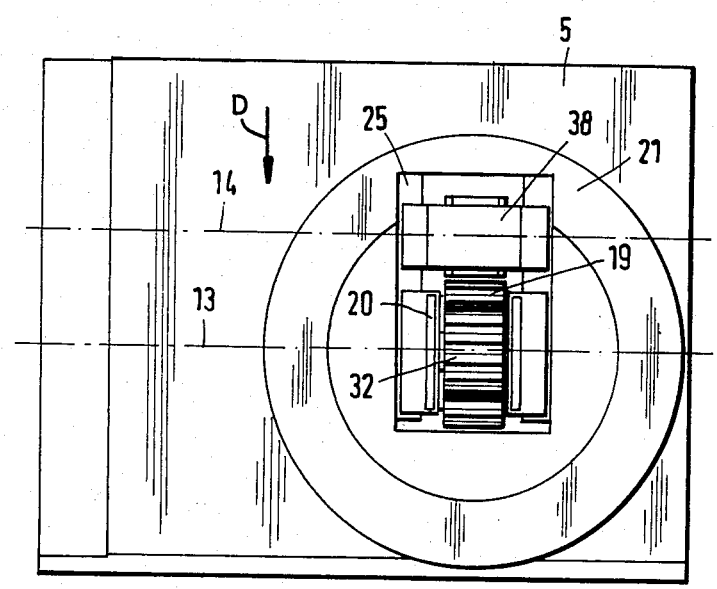
FIG. 5 is a top view taken in the direction V of FIG. 4.

As seen in the drawing, the apparatus according to this invention has a beam or frame 1 extending horizontally perpendicular to a workpiece displacement direction D and carrying two identical housings 2 each in turn carrying an upper cutter blade 3 and a lower blade 41 defining a respective cutting plane P and rotatable about respective axes 42 and 43. These blades 3 and 41 have hardened edges lying to opposite sides of the plane P as is known.

The beam 1 is as seen in FIG. 2 of right-trapezoidal section and has a top plate 11 defining an inclined and planar upper surface 44 lying in a plane converging downstream with that of the workpiece. Each housing 2 has a slide base 5 having a lower surface 45 that lies flat on the surface 44 and that is defined by a base plate 46 provided at its upper and lower edges with ridge guides 6. This plate 46 is provided at its surface 44 with slide stones 10 facilitating movement of the two surfaces 44 in any direction parallel to their planes. In addition pistons 8 are actuatable by means terminating at a passage 9 to press outward from the base 1 against the lower guide 6 to press the upper guide 6 tightly against the corresponding edge of the support 1.

FIG. 2A shows how the lower edge of the base 1 is provided with an upstanding guide 7 against which the lower edge of the plate 46 rides. This system, like that of FIG. 2, ensures that gravity alone ensures perfect positioning in the transport direction D of the slide 5. Such mounting of the housing 1 is particularly advantageous in that it assures proper positioning of the cutter blades 3 and 41 in the transport direction D while allowing them to move relatively transversely of this direction.

The base 1 is provided internally with transversely throughgoing drive and positioning shafts 13 and 14 rotatable about respective axes 23 and 47 and supported inside the base 1 at several locations on respective roller bearings 15, 16, 17, and 18. The ends of these shafts 13 and 14 can be covered by respective removable covers 4 and 48 so that drive motors 49 and 50 can be connected to them at either end. The motors 49 and 50 can be mounted right on the ends of the beam 1 or on the floor adjacent the beam 1, and the opposite ends of the respective shafts 13 and 14 are sealed off by the covers 4 and 48.

The top plate 11 of the base 1 is formed at each end underneath the respective slide 5 with an opening 51 covered in part by the respective slide 5 and in part by an accordion cover or cuff 12 fixed between the upright end plate 52 of the frame 1 and the confronting outer edge of the slide 5. Thus the entire interior of the frame or beam 1 is closed. All the parts can therefore be lubricated simply by providing an oil bath in the beam or frame 1.

The housing 2 has a base plate 26 formed centered on a vertical axis 22 perpendicular to and intersecting the axis 23 with a cylindrical boss or rim 27 fitting within a cylindrical tubular extension 21 fixed in turn to the base plate 46, the parts 21, 26, and 46 together forming the slide 5. The parts 26 and 21 are secured together by bolts 55 equispaced about the axis 22 so that the entire support 2 can be mounted in at least two 180° offset positions, allowing identical slides 5 to be used for both the cutter assemblies.

The drive shaft 13 has at each end at the respective axis 22 and underneath the respective hole 51 a splined region 53 on which a drive gear 19 can slide along the axis 23. Directly above this gear 19 the slide 5 is formed with a rectangular hole 24 having two sides provided with rails 25 extending parallel to the displacement direction D and serving as stiffeners fixed in the slide 5. Projecting down between these rails 15 are a pair of brackets 20 carrying a bearing 54 for the gear 19, and journaling the ends of a shaft 31 carrying a small-diameter intermediate gear 32 meshing with the gear 19.

The lower cutting disk or blade 41 is carried on a shaft 28 supported on roller bearings in the housing 2 and carrying a one-way or overrunning sprag-type clutch 30 in turn carrying a gear 29 meshing with the gear 32. Thus this shaft 28 and its blade 41 can be driven by the motor 49 via the shaft 13, the splining 53, the gear 19, the gear 32, the gear 29, and the clutch 30. If the metal is being pulled through or moves faster than the peripheral speed the wheel 41 is driven at, the clutch 30 will allow such overrunning. The centering of this gear train 19, 32, and 29 on the axis 22 allows the above-described 180° offset positioning of the housing 2. Since the lowermost drive gear 19 is partly immersed in the oil bath in the beam 1, the entire gear chain is lubricated.

Figure 6:
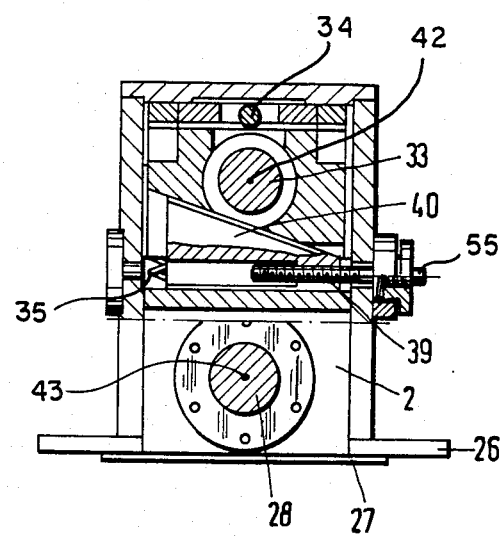
FIG. 6 is a section taken along line VI—VI of FIG. 3.

The upper cutter blade 3 is carried on a shaft 33 journaled in the housing 1 and displaceable axially by means of a threaded spindle 34 to adjust the relative axial spacing of the blades 3 and 41 at the plane P. Prestressed springs 35 allow some vertical displacement of the blade 3 and a wedge 40 can be displaced in the transport direction D by means of a threaded spindle 55 (FIG. 6) to adjust the height of the upper axis 42, which like the lower axis 43 need not be parallel to the axes 23 and 47.

The position-adjusting spindle 14 has at each end a threaded portion 56 threaded in a respective nut 36 shown in FIG. 4 and carried in a holder 37 vertically displaceable in a guide 38 slidable in the direction D between the rails 25. The threaded portions 56 are of opposite hand but of the same pitch so that rotation of the spindle 14 in one direction by the respective motor 50 will move the two housings 2 identically toward each other, and opposite rotation will move them apart.

The structure according to this invention is extremely compact. At the same time the symmetrical construction makes it relatively easy to manufacture and service it, while allowing a system to be rebuilt easily, as for instance by switching the sides for the drive motors 49 and 50.

I claim:

1. A rotary shear for trimming sheet metal, the shear comprising:
   a main support beam extending perpendicular to a normal workpiece transport direction and symmetrical about a central upright plane extending in the transport direction, the beam having a generally planar upper surface formed by a family of parallel and horizontal lines and inclined downward against the transport direction;
   a pair of symmetrically identical housings carried on the beam and each displaceable therealong transverse to the direction, the housings each being provided with a slide having a planar lower surface lying generally flatly on the beam surface, the housings and beam being provided with guides engageable parallel to the surfaces with each other, the surfaces being inclined so much to the horizontal that the guides are naturally urged together in the transport direction, the surfaces and materials of the slide and beam being such that the horizontal component of force effective by gravity between them is greater than the friction between them; and
   respective pairs of upper and lower rotary trimming blades carried on the housings, the upper and lower blades being rotatable about respective common axes substantially perpendicular to the transport direction.

2. The rotary sheet-metal trimming shear defined in claim 1 wherein the guides extend horizontally perpendicular to the transport direction.

3. The rotary sheet-metal trimming shear defined in claim 2 wherein the guides are ridges projecting downwardly from the slides and flanking the respective beam surfaces in the transport direction, whereby the slides are generally downwardly U-shaped.

4. The rotary sheet-metal trimming shear defined in claim 2, further comprising
   an actuator effective generally in the transport direction parallel to the surfaces to urge the guides together.

5. The rotary sheet-metal trimming shear defined in claim 2, further comprising
   low-friction slide elements between the surfaces.

6. The rotary sheet-metal trimming shear defined in claim 1 wherein the housing is hollow and is substantially wholly closed.

7. The rotary sheet-metal trimming shear defined in claim 6 further comprising
   drive means extending through the beam for rotating the blades about the respective axes; and
   positioning means extending through the beam for displacing the housing transversely of the direction on the beam.

8. The rotary sheet-metal trimming shear defined in claim 7 wherein the drive and positioning means include respective drive and positioning shafts extending horizontally transverse to the direction through the beam and respective pluralities of bearings supporting these shafts.

9. The rotary sheet-metal trimming shear defined in claim 8 wherein the positioning shaft has a pair of oppositely threaded end regions and the housings are provided with internally threaded nuts engaging the respective end regions.

10. The rotary sheet-metal trimming shear defined in claim 8 wherein the drive shaft is provided under each housing with a respective drive gear displaceable limitedly along the drive shaft but rotationally coupled thereto.

11. The rotary sheet-metal trimming shear defined in claim 10 wherein each housing is provided with support brackets carrying the respective drive gear and fixed in the housing against movement horizontally transverse of the transport direction.

12. The rotary sheet-metal trimming shear defined in claim 11 wherein each lower blade is provided with a blade gear operatively engaged with the respective drive gear.

13. The rotary sheet-metal trimming shear defined in claim 12, further comprising a one-way clutch connected between each lower blade and the repsective drive gear.

14. The rotary sheet-metal trimming shear defined in claim 13, further comprising respective intermediate gears meshing with the respective blade and drive gears.

15. The rotary sheet-metal trimming shear defined in claim 8, further comprising
   blade shafts carrying the blades and parallel to the respective drive and positioning shafts.

16. The rotary sheet-metal trimming shear defined in claim 1, further comprising means for vertically displacing the upper blades relative to the lower blades.

17. The rotary sheet-metal trimming shear defined in claim 1 wherein each housing has a downwardly directed formation centered on an upright axis, each housing including a slide sitting on the beam and having an upwardly directed formation complementary to and interfitting with the downwardly directed formation, the shear comprising means for securing the housing in either of two 180° offset positions relative to the upright axis on the slide.

18. The rotary sheet-metal trimming shear defined in claim 1, further comprising means for displacing the upper blade horizontally transverse to the transport direction relative to the respective lower blade.

19. The rotary sheet-metal trimming shear defined in claim 1 wherein the slide and beam are of generally right-trapezoidal section.

* * * * *